(12) United States Patent
Ruetten et al.

(10) Patent No.: US 9,201,150 B2
(45) Date of Patent: Dec. 1, 2015

(54) SUPPRESSION OF DIRECT DETECTION EVENTS IN X-RAY DETECTORS

(75) Inventors: Walter Ruetten, Linnich (DE); Tiemen Poorter, Eindhoven (NL); Rainer Kiewitt, Roetgen (DE)

(73) Assignee: Koninklijke Philips N.V., Eindhoven (NL)

(*) Notice: Subject to any disclaimer, the term of this patent is extended or adjusted under 35 U.S.C. 154(b) by 840 days.

(21) Appl. No.: 12/918,096

(22) PCT Filed: Feb. 19, 2009

(86) PCT No.: PCT/IB2009/050691
§ 371 (c)(1),
(2), (4) Date: Aug. 18, 2010

(87) PCT Pub. No.: WO2009/107045
PCT Pub. Date: Sep. 3, 2009

(65) Prior Publication Data
US 2010/0329421 A1  Dec. 30, 2010

(30) Foreign Application Priority Data
Feb. 25, 2008  (EP) .................................... 08101968

(51) Int. Cl.
*G01J 1/26* (2006.01)
*G01T 1/20* (2006.01)
*H04N 5/32* (2006.01)
*H04N 5/357* (2011.01)

(52) U.S. Cl.
CPC ............... *G01T 1/2018* (2013.01); *H04N 5/32* (2013.01); *H04N 5/357* (2013.01)

(58) Field of Classification Search
USPC .................. 250/370.01, 370.08, 370.09, 371, 250/370.07
See application file for complete search history.

(56) References Cited

U.S. PATENT DOCUMENTS

| 6,201,891 B1 * | 3/2001 | Ino et al. ........................ 382/132 |
| 6,747,697 B1 | 6/2004 | Lin et al. |
| 6,947,086 B1 | 9/2005 | Rütten et al. |
| 2002/0011551 A1 | 1/2002 | Nair |
| 2002/0191828 A1 * | 12/2002 | Colbeth et al. ................. 382/132 |
| 2004/0000630 A1 * | 1/2004 | Spartiotis et al. .......... 250/208.1 |
| 2008/0012723 A1 | 1/2008 | Wang |

FOREIGN PATENT DOCUMENTS

| GB | 2332585 A | 6/1999 |
| JP | 2001189891 A | 7/2001 |
| JP | 203329777 A | 11/2003 |

(Continued)

*Primary Examiner* — Rafferty Kelly

(57) ABSTRACT

According to an embodiment of the invention, signals coming from a number of pixels or sub-pixels are compared and those signals from pixels or sub-pixels, which are substantially brighter than the other pixels in the comparison, are excluded from contributing to the output signal, to suppress direct detection events in X-ray detectors. For this an X-ray detector apparatus (101) can comprise: —an array (102) of pixel arrangements (303), —each pixel arrangement (303) comprising at least one radiation collection device (311) for converting incident radiation into a collection device signal, —switching arrangements (313, 324, 314, 142; 313, 315, 314, 352, 142; 313, 315, 314; 361) for providing to respectively one output element (141) a signal derived from the collection device signals of a plurality of radiation collection devices (311) of at least one pixel arrangement (303).

32 Claims, 7 Drawing Sheets

(56) References Cited

FOREIGN PATENT DOCUMENTS

| | | |
|---|---|---|
| JP | 2004503030 A | 1/2004 |
| WO | 02082545 A1 | 10/2002 |
| WO | 2005088345 A1 | 9/2005 |

\* cited by examiner

US 9,201,150 B2

SUPPRESSION OF DIRECT DETECTION EVENTS IN X-RAY DETECTORS

FIELD OF THE INVENTION

The invention concerns detectors and methods to suppress direct detection events in X-ray detectors.

BACKGROUND OF THE INVENTION

WO2005088345 discloses an X-ray detector with a photosensitive detector layer above which a scintillation layer for the conversion of X-rays into photons is disposed.

Semiconductor X-ray detectors are built by combining a scintillator or a photoconductor with a semiconductor imaging device. In the first case, the scintillator converts X-ray quanta to light and the light is converted in the semiconductor imaging device into electrical charges, which are finally read out to yield an image. In the second case, the photoconductor immediately converts absorbed X-ray quanta into electric charges, which are collected by the imager and which are finally read out to yield the image.

The imaging devices can include flat panel imagers based on amorphous silicon or polycrystalline silicon with photodiodes or charge collection electrodes in the pixel matrix. Other forms of imaging devices are charge coupled devices (CCD) and imagers based on complementary metal oxide semiconductors (CMOS imagers). The latter imaging devices often take the form of so called active pixel sensors because they contain transistors in the pixel to amplify the signals.

A common problem with semiconductor X-ray detectors is that not all X-ray quanta are absorbed in the conversion layer, i.e. in the scintillator or photoconductor.

The X-ray quanta which go through the conversion layer can, with a low probability, cause an interaction in the semiconductor imaging device, depositing a usually large amount of charge in a single pixel. This results in a number of very bright pixels in each image. In the following text, such an event will be referred to as "parasitic direct detection event".

The intended process of conversion of X-ray quanta in the conversion layer and collection of light or charges by the imager usually happens much more frequent but with a much lower charge yield.

Hence, in addition to the normal image, a small number of very bright pixels can be observed in each image. The number and position of bright pixels change from image to image and substantially disturb the intended image.

SUMMARY OF THE INVENTION

Therefore, it is an object of the present invention to overcome these shortcomings of the prior art. This is accomplished by what is set forth in the appended independent claims, while the appended dependent claims define advantageous modifications thereof.

Specifically, according to a first aspect of the present invention described in claim 1, there is provided an X-ray detector apparatus comprising
an array of pixel arrangements,
each pixel arrangement comprising at least one radiation collection device for converting incident radiation into a collection device signal,
arbitration or switching arrangements for providing to respectively an output element a signal derived from the collection device signals of a plurality of radiation collection devices of at least one pixel arrangement. An arbitration arrangement can be any arrangement that arbitrates (signals derived from the) collection device signals of a plurality of radiation collection devices of at least one pixel arrangement, i.e. e.g. any arrangement that somehow considers those signals and tries to suppress a signal (from a radiation collection device) which is much brighter or darker due to a direct detection event than signals from other radiation collection devices, so that an output depends significantly less on that signal (which is much brighter or darker due to a direct detection event) than the output would depend on it without the arbitration device (i.e. preferably less than it would with e.g. only an averaging unit).

Preferably the arbitration arrangement is designed for suppressing a radiation collection device output signal of a radiation collection device, which radiation collection device output signal's brightness differs by more than a predetermined value or factor from the brightness of radiation collection devices output signals of a plurality of further radiation collection devices. Such predetermined value or factor can have a very broad range of values depending on e.g. the detector apparatus. The predetermined value or factor can be chosen depending on the detector apparatus in a way which provides a satisfactory suppression of bright or dark direct detection event pixels without deteriorating the received image more than acceptable—the choice of the predetermined value or factor can theoretically also be done depending on a developers impression of received images if no other more convincing criteria would be found.

Preferably, each pixel arrangement comprises one radiation collection device, wherein switching arrangements comprise select lines respectively operable to cause connection of a plurality of pixel arrangements to one readout line, and wherein the switching arrangements further comprise switches operable to connect adjacent readout lines of the array of detector pixels,
wherein the connected adjacent readout lines are connected to either one output element or several output elements.

Preferably a signal derived from the collection device signals of four radiation collection devices is provided to an output element.

Preferably, when a signal from at least two, preferably at least four radiation collection devices is provided to an output element, the sources of all amplifier transistors are connected together, but the gates of the amplifier transistors, which are connected to their respective radiation collection devices, are at different potientials.

Preferably a transistor in a pixel arrangement affected by a parasitic direct detection event has a lower gate potential and the transistor contributes to a smaller extent to the output signal to allow that the signal from the parasitic direct detection event is suppressed.

Preferably output elements comprise amplifiers.

Preferably a pixel arrangement further comprises a sample and hold circuit comprising a sample switch, a sample capacitor and a buffer amplifier.

Preferably additional switches, when connected through, and lines connect sampling capacitors in horizontal direction of the array under control of a control circuit.

Preferably the number of adjacent pixel arrangements connected for arbitration is the smallest divisor of the number of adjacent pixel arrangements connected for binning following the arbitration.

Preferably additional switches, when connected through, and column lines connect sampling capacitors in vertical direction of the array under control of a control circuit.

Preferably sampling capacitors of four adjacent pixel arrangements are connected when at least two, preferably at least four binning switches are activated. Preferably the number of adjacent pixel arrangements connected for arbitration is the smallest divisor of the number of adjacent pixel arrangements connected for binning following the arbitration. E.g. if the number of adjacent pixel arrangements connected for binning is 4*4 (four pixel arrangements in a row and four pixel arrangements in a column) the number of adjacent pixel arrangements connected for arbitration can be e.g. 2*2, as 2 is the smallest divisor of 4.

Preferably a pixel arrangement comprises a plurality of radiation collection devices which plurality of radiation collection devices are connectable via switches to one readout switch for the plurality of radiation collection devices.

Preferably a pixel arrangement comprises a plurality of radiation collection devices which plurality of radiation collection devices are connectable via one switch or a plurality of switches to a common sample capacitor.

Preferably a radiation collection device is a photodiode or a charge collection electrode.

Preferably a pixel arrangement comprises a number of radiation collection device and the radiation collection devices' signals are fed into an arbitration circuit configured to exclude a collection device signal from a radiation collection device from contributing to the output signal, if the collection device signal differs from the other collection device signals by more than a predetermined value or factor, wherein the arbitration circuit output is connected to a readout switch.

Preferably the arbitration circuit is configured to compare signals coming from a number of radiation collection devices in one pixel arrangement or a plurality of pixel arrangements and wherein the arbitration circuit is configured to exclude signals from those radiation collection device, which are substantially brighter or darker than the signals from other radiation collection devices in the comparison, from contributing to an output signal provided to an output.

According to a second aspect of the present invention, there is provided a method for handling radiation collection device output signals of a plurality of radiation collection devices of at least one pixel arrangement of an X-ray detector apparatus, wherein a signal derived from the radiation collection device output signals of a plurality of radiation collection devices of at least one pixel arrangement is provided to respectively one output element, wherein at least one radiation collection device output signal is suppressed.

Other aspects, features and advantages of the present invention will become more fully apparent from the claims and the following detailed description of preferred embodiments thereof which is to be taken in conjunction with the appended drawings.

DETAILED DESCRIPTION OF EMBODIMENTS

Figure 1:
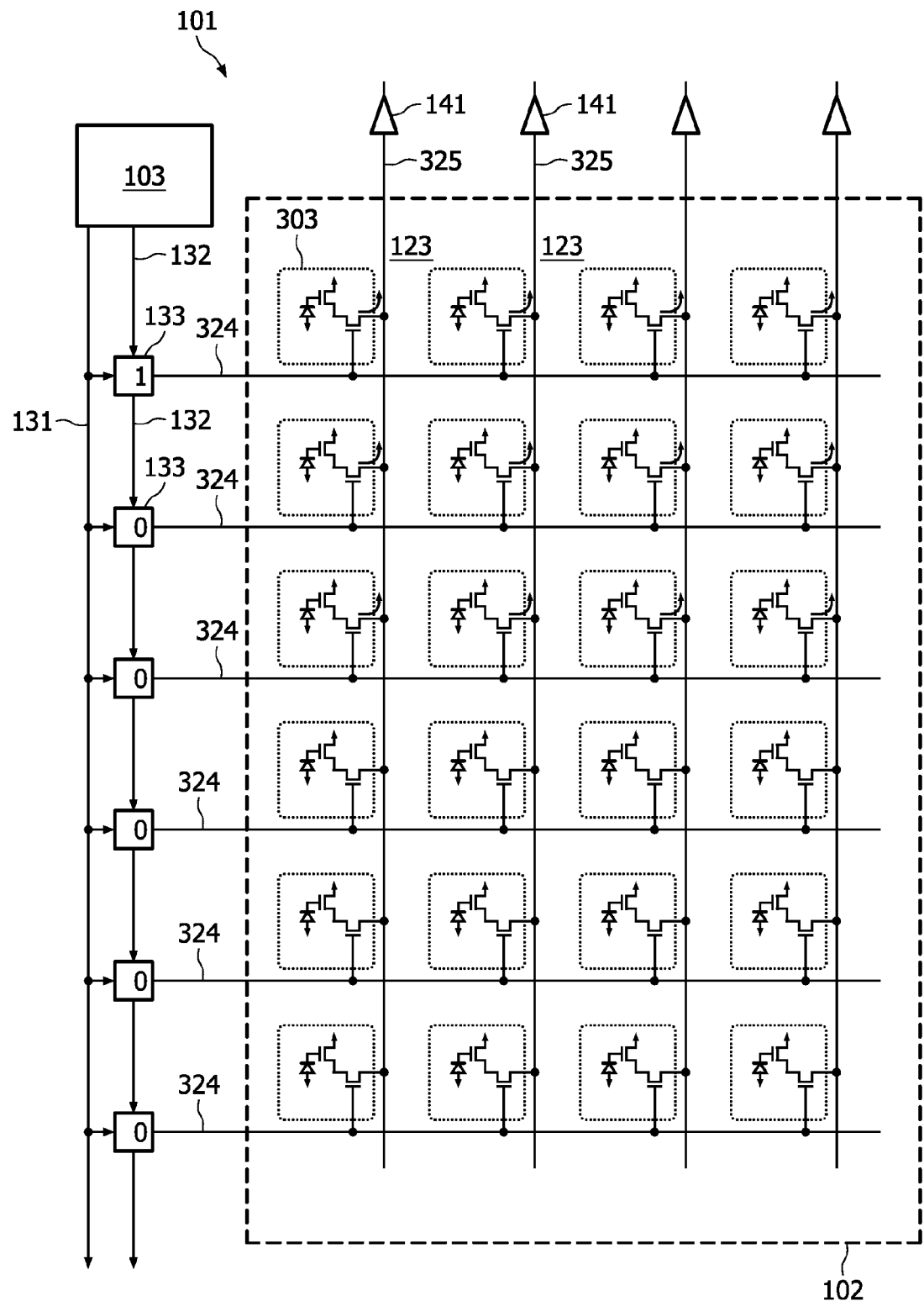
FIG. 1 shows a common architecture of a semiconductor imaging device.

FIG. 1 shows a usual architecture of a semiconductor imaging device (101). It contains a pixel matrix (102) which is composed of pixels (303). The pixels (303) are activated via select lines (324) by a vertical shift register (133) with a clock line (131) and a data line (132). The image signal of all pixels (303) is readout line by line over the readout columns (325) into output elements which are column amplifiers (141).

Figure 2:
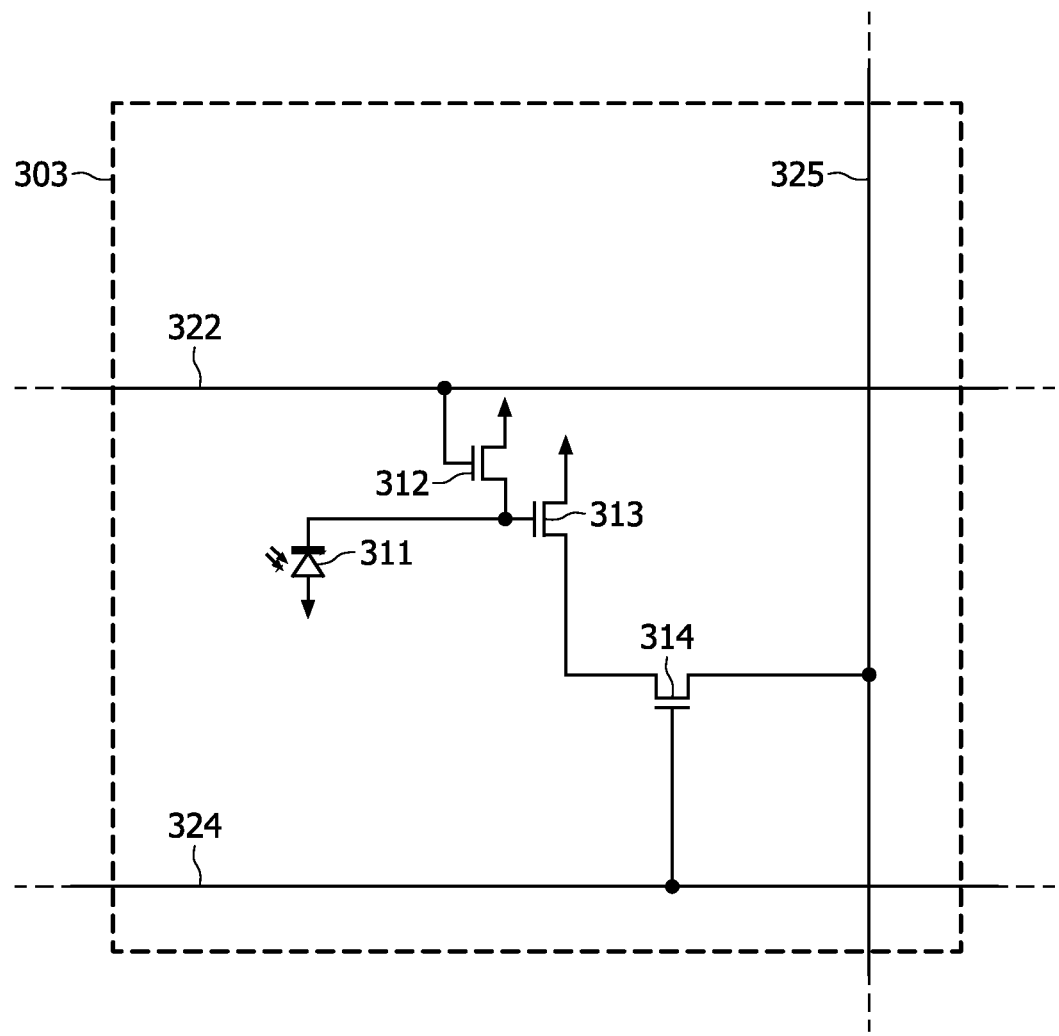
FIG. 2 shows a detailed schematic of a single active pixel.

A detailed schematic of a simple active pixel (303) is shown in FIG. 2. It contains a collection device, e.g. a photodiode (311) to collect the signal. Furthermore it has a reset switch (312) to charge the photodiode (311) to a predefined voltage under control of the reset line (322).

The exposure of the photodiode causes the voltage to drop depending on the collected signal.

An amplifier transistor (313) copies the voltage from the photodiode to the output column (325) when the readout switch (314) is activated via a select line (324).

The output current of the amplifier transistor depends on the voltage between its gate (connected to the photodiode (311), receiving as input the photodiode (311) output signal) and its source (connected via the readout switch to the readout column).

Figure 3:
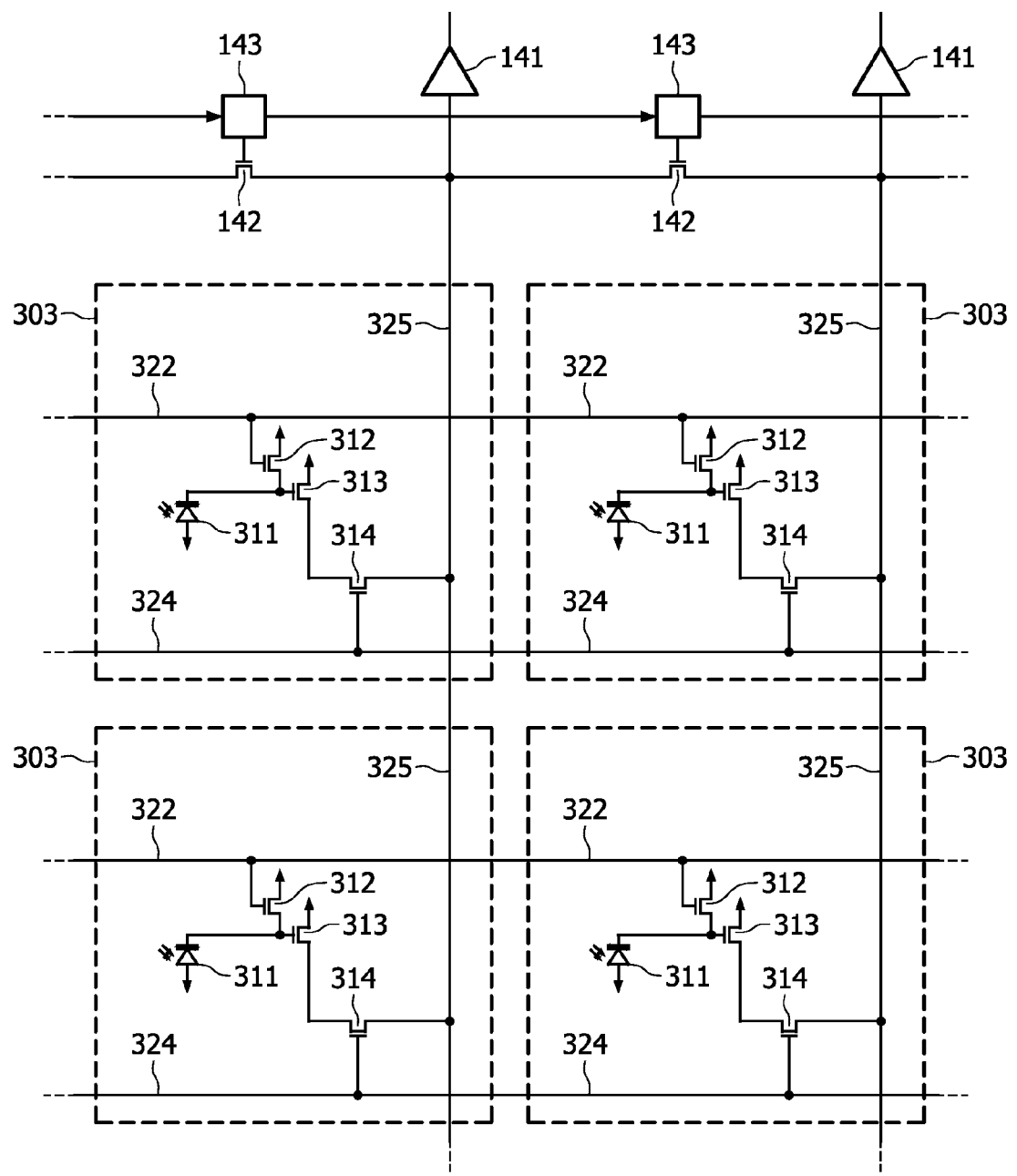
FIG. 3 shows a first embodiment of the invention.

A first embodiment of the invention is shown in FIG. 3. It shows a part of the pixel matrix from FIG. 1. The first embodiment of the invention adds switches (142) which can connect adjacent readout columns under the control of a configuration circuit (143), e.g. a shift register.

According to first embodiment of the invention, e.g. two adjacent select lines (324) are activated at the same time and pairs of adjacent readout columns (325, 325) are connected by switches (142) between them. The further switches (142) are inactive. In this way, sets of four pixels are readout over the same column amplifiers (141) and the source terminals of the amplifier transistors are connected during readout. (Generally for arbitration according to the invention at least two pixels can be considered, preferably at least four are considered. A rectangular selection (e.g. all in 2 adjacent rows and all in 3 adjacent columns), of at least 1*2=2 pixels can be considered or a quadratic selection (e.g. all in 2 adjacent rows and all in (as many, i.e.) 2 adjacent columns) of at least 2*2=4 pixels can be considered.) In a normal image, all four pixels will have very similar brightness values. This leads to similar voltages on the photodiodes, resulting in similar gate source voltages in the four pixels and hence all amplifier transistors (313) will contribute similarly to the output signal.

If one of the pixels is hit by a parasitic direct detection event, the large amount of deposited charge will cause a substantial discharging of the affected photodiode. When reading out the four pixels, the sources of the amplifier transistors (313) are again connected, but the gates are now at different potentials. Especially the transistor in the pixel affected by the parasitic direct detection event has a lower gate potential. Hence this transistor will contribute to a smaller extent to the output signal as the output signals of four pixels are readout over the same amplifier (141) thus leveling the output of the transistor in the pixel affected by the parasitic direct detection event and the signal from the parasitic direct detection event is effectively suppressed.

Figure 4:
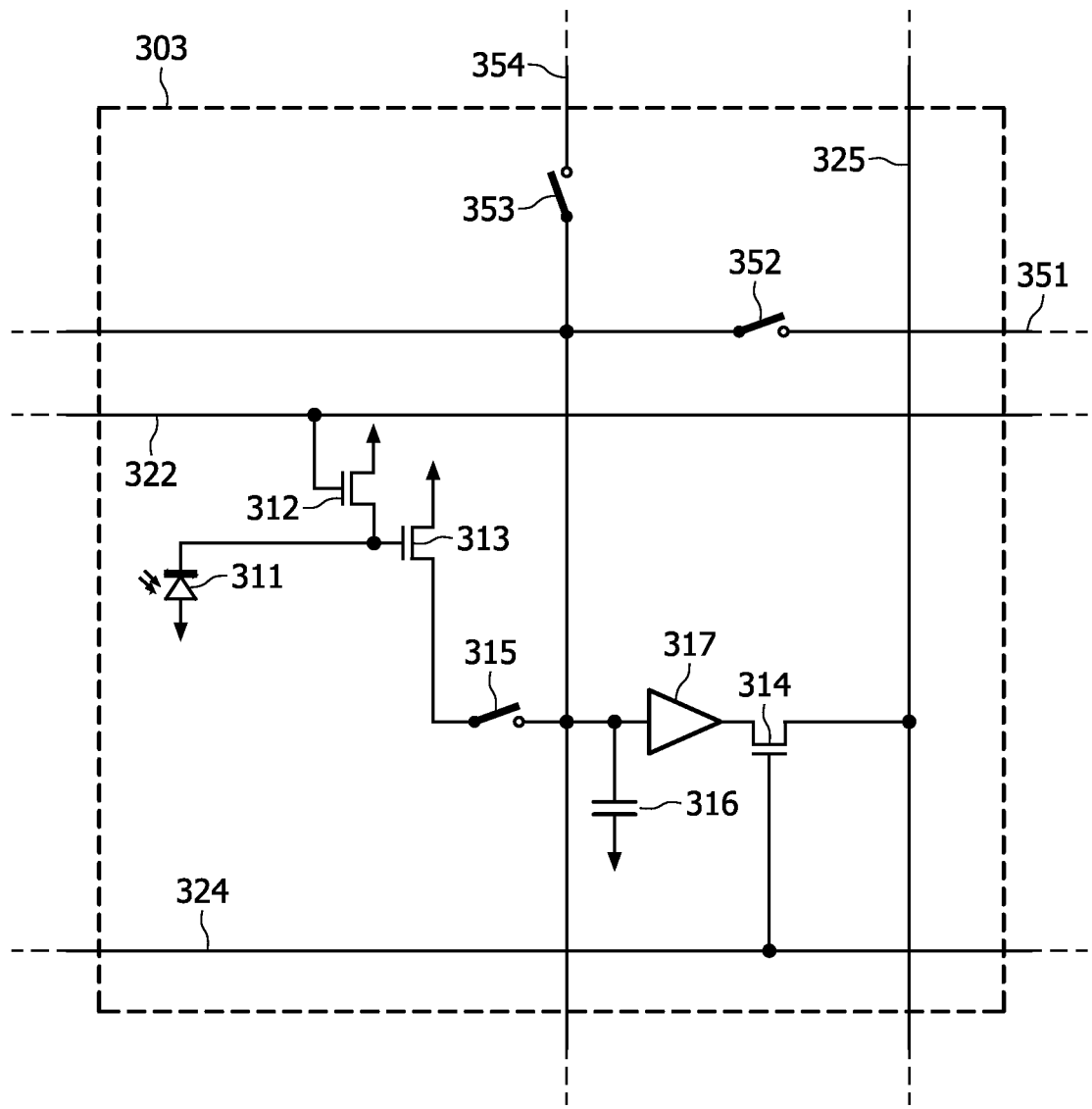
FIG. 4 shows a second embodiment of the invention.

A second embodiment of the invention uses a more sophisticated pixel cell depicted in FIG. 4. This cell (303) contains also a photodiode (311), a reset switch (312), an amplifier transistor (313), a readout switch (314) and the associated control and readout lines (322), (324), (325).

In addition, it has a sample and hold circuit consisting of sample switch (315), sample capacitor (316) and buffer amplifier (317). Following the X-ray exposure, the signal from the photodiodes can be transferred to the sample capacitor (316) by activating the sample switches (315). The sampled signal can be read out via the buffer (317) and readout switch (314) independently from the next exposure on the photodiode (311). The sampling action is often referred to a synchronous shutter in the imager world.

Additional switches (352) and lines (351) allow connecting the sampling capacitors in horizontal direction under control of a not shown control circuit. Likewise, additional switches (353) and columns (354) allow connecting the sampling capacitors in vertical direction, again under control of a not shown control circuit. This operation is called binning in the following text.

Figure 5:
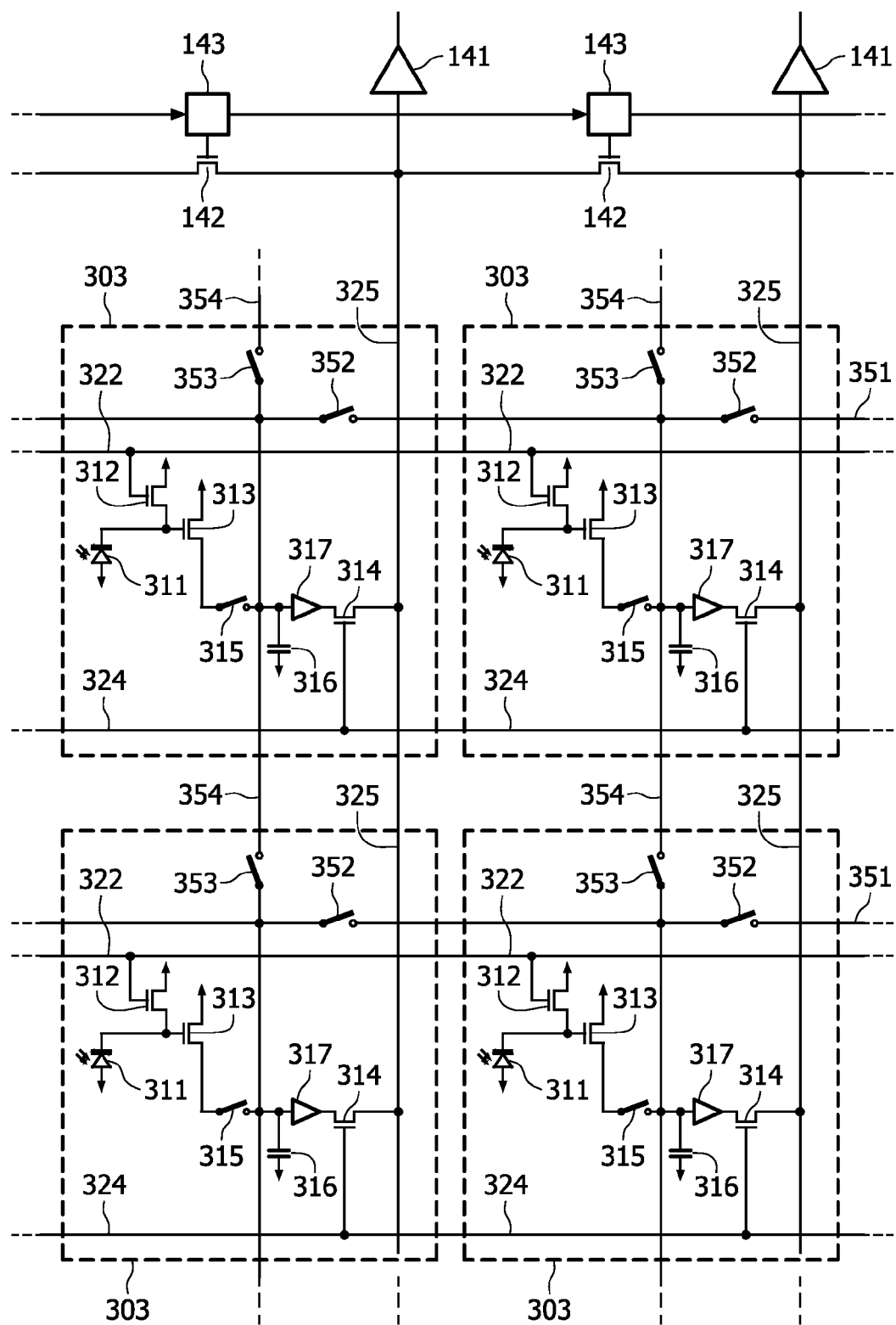
FIG. 5 shows connection of the sampling capacitors of four adjacent pixels by activating appropriate binning switches.

Referring to FIG. 5, the sampling capacitors of four shown adjacent pixels (each with the reference numeral 303) can be connected by activating the appropriate binning switches (352) and (353). If this is done while the sample switches (315) are being activated, again the sources of the amplifier transistors (313) are at the same potential.

If the pixels have similar exposure levels, the resulting similar gate source voltages yield similar contributions from all four pixels.

If one pixel is affected by a parasitic direct detection event, it will have a substantially lower gate voltage and consequently will contribute less to the signal being copied to the interconnected sampling capacitors. The signal of the parasitic direct detection event is effectively suppressed.

Figure 6:
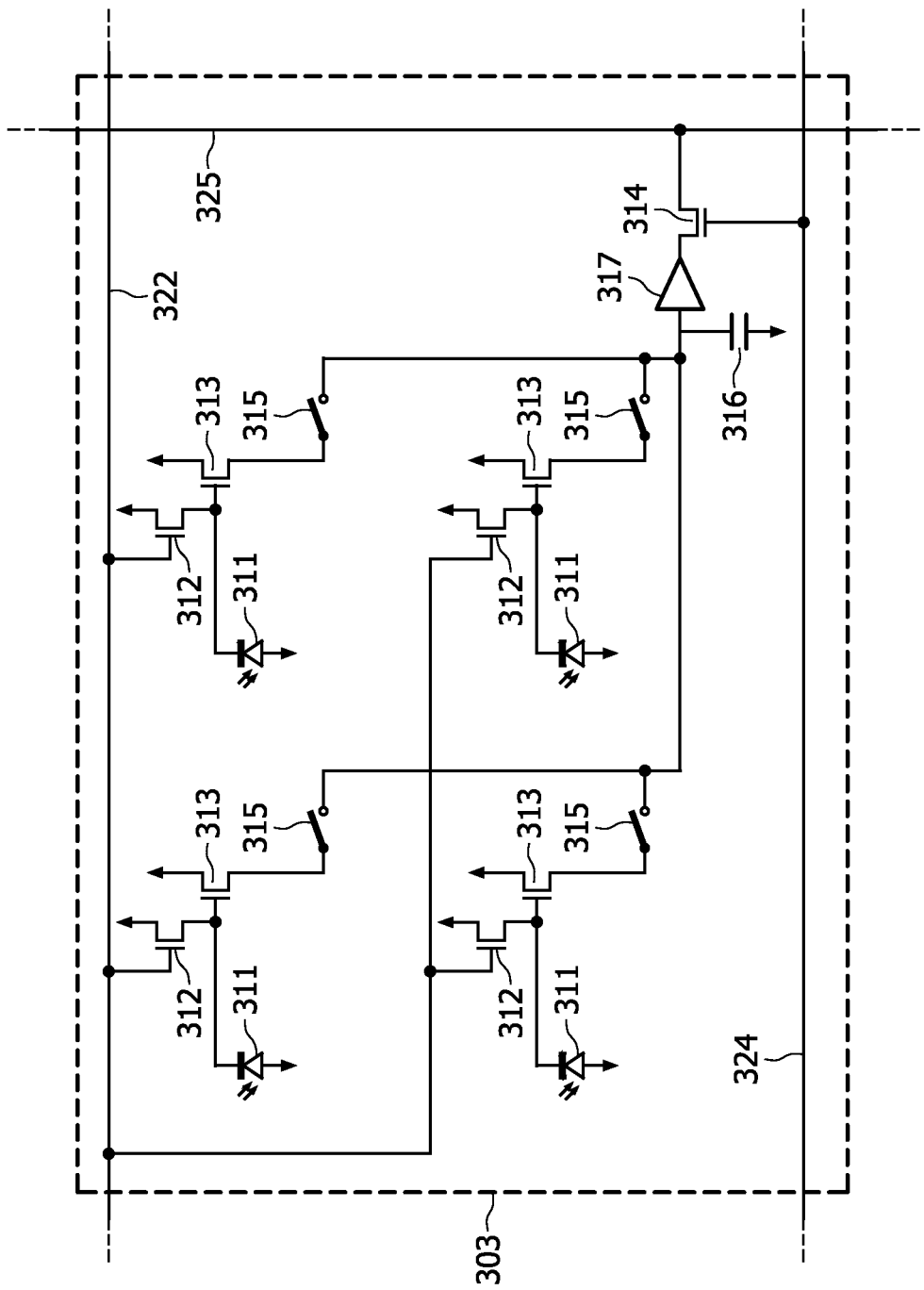
FIG. 6 shows a third embodiment of the invention.

A third embodiment of the invention is depicted in FIG. 6. Here a pixel (303) is subdivided into four sub-pixels each comprising a photodiode (311), an amplifier transistor (313) and a sample switch (315). A number of radiation collection devices, e.g. photodiodes (311) and amplifier transistors (313) connect via sample switches (315) to a common sample capacitor (316). A buffer (317) and readout switch (314) allow readout of the pixel.

Analogically to the previous embodiments, a sub-pixel affected by a parasitic direct detection event will have a lower gate potential than the other pixels, hence it will contribute less to the charging of the sample capacitor. Consequently, the signal from the parasitic direct detection event will be effectively suppressed.

A modification of this circuit uses only one sampling switch (315). Its left terminal is directly connected to the source terminals of all amplifier transistors in the pixel (no figure).

Figure 7:
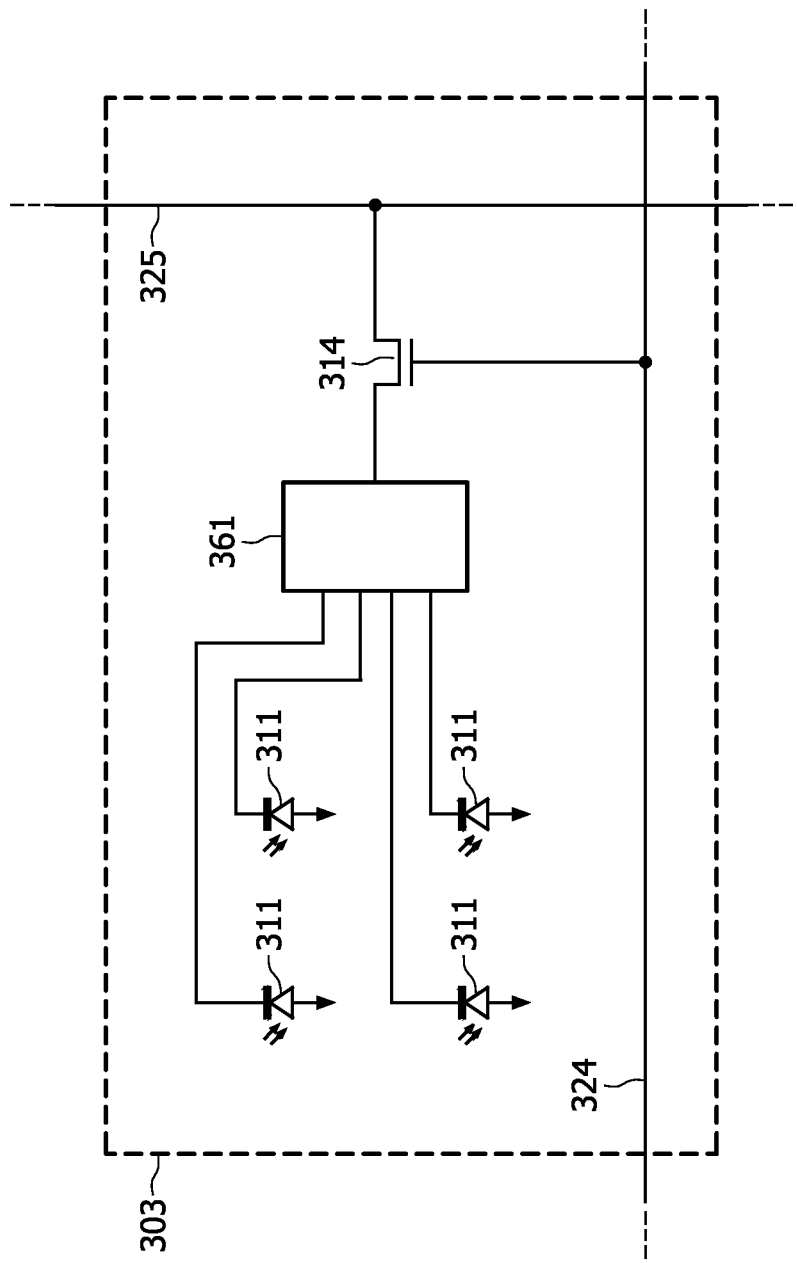
FIG. 7 shows a fourth embodiment of the invention.

A fourth embodiment is shown in FIG. 7. As in the previous embodiment, the pixel arrangement (in the following named pixel) (303) is sub-divided into a number of sub-pixels with photodiodes or charge collection electrodes (311). Their signals are fed into an arbitration circuit (361) which excludes the sub-pixels affected by a parasitic direct detection event from contributing to the output signal. The output of the arbitration circuit can be read out via the readout switch (314).

The invention can be applied to all semiconductor X-ray detectors (embodiment 4) and X-ray systems using semiconductor X-ray detectors.

Embodiments 1 to 3 are especially suited to semiconductor X-ray detectors making use of active pixel circuits and the X-ray systems using those semiconductor X-ray detectors.

According to an embodiment of the invention an arbitration circuit or arrangement compares the signals coming from a number of pixels or sub-pixels and it excludes those pixels or sub-pixels, which are substantially brighter than the other pixels in the comparison, from contributing to the output signal, in order to suppress direct detection events in X-ray detectors.

What has been described above is what is presently considered to be a preferred embodiment of the present invention. However, as is apparent to the skilled reader, it is provided for illustrative purposes only and is in no way intended to that the present invention is restricted thereto. Rather, it is the intention that all variations and modifications be included which fall within the spirit and scope of the appended claims.

The invention claimed is:
1. An X-ray detector apparatus comprising:
a conversion layer subject to an occurrence of a parasitic direct detection event;
an array of pixel arrangements, one or more arrangements from said array each comprising
one or more radiation collection devices for converting incident radiation into associated radiation collection device output signals;
a pixel readout line common to transistors connected respectively to said devices; and
a switching arrangement for providing a readout signal to said line;
said apparatus being configured for:
responsive to said occurrence, lowering a potential at a transistor from among said transistors;
detecting the lowered potential; and
via said switching arrangement and based on a result of the detecting, excluding output from said transistor from contributing to said readout signal.
2. The apparatus according to claim 1, said apparatus being further configured for:
responsive to said occurrence, measuring potential respectively for one or more remaining ones of said transistors; and
applying a pixel brightness threshold in making a comparison between said lowered potential and said one or more remaining potentials,
said excluding being dependent on whether said threshold is met.
3. The apparatus according to claim 2, a potential from among said one or more remaining potentials and said lowered potential pertaining to transistors of a single pixel arrangement from among said arrangements.
4. The apparatus according to claim 2, said making comprising comparing said signals coming from respectively at least of said devices.
5. The apparatus according to claim 1, said line being connected to an output element.
6. The apparatus according to claim 1, comprising a select line operable to cause connection of a plurality of said pixel arrangements to said readout line, said apparatus comprising a plurality of readout lines, said readout line being from among said plurality, said switching arrangement further comprising switches operable to connect adjacent ones of the readout lines that are connected to an output element.
7. The apparatus according to claim 1, a signal derived from said signals of at least two of said devices being provided to an output element.
8. The apparatus according to claim 1, signals of at least two of said devices being provided to an output element.
9. The apparatus according to claim 1, said line being connected to an output element that comprises an amplifier.
10. The apparatus according to claim 1, wherein a pixel arrangement from among said one or more arrangements further comprises a sample and hold circuit that comprises a sample switch, a sampling capacitor and a buffer amplifier.
11. The apparatus according to claim 10, wherein additional switches, when connected through, and lines connect the sampling capacitors.
12. The apparatus according to claim 11, wherein said additional switches, when connected through, and said lines connect the sampling capacitors in respectively a vertical direction of the array, a horizontal direction of the array, or both directions.

13. The apparatus according to claim 10, wherein another pixel arrangement from among said arrangements further comprises a sample and hold circuit that comprises a sample switch, a sampling capacitor and a buffer amplifier, the sampling capacitors of at least two of said arrangements being connected when binning switches are activated.

14. The apparatus according to claim 1, wherein a number of either row- or column-wise adjacent pixel arrangements connected for arbitration that entails said detecting is the smallest number, greater than one, serving as a divisor of a number of either row- or column-wise adjacent pixel arrangements connected for binning following the arbitration.

15. The apparatus according to claim 1, wherein a pixel arrangement from among said one or more arrangements comprises a plurality of radiation collection devices which plurality of radiation collection devices are all connectable via one switch or a plurality of switches to one readout switch.

16. The apparatus according to claim 1, further configured such that a pixel arrangement from among said one or more arrangements comprises a plurality of radiation collection devices which plurality of radiation collection devices are connectable via one switch or a plurality of switches to a common sample capacitor.

17. The apparatus according to claim 1, wherein a radiation collection device from among said devices is a photodiode or a charge collection electrode.

18. An X-ray examination apparatus comprising: an X-ray source for exposing an object to be examined to X-ray energy; and an X-ray detector apparatus as claimed in claim 1, for receiving an X-ray image of the object to be examined.

19. The apparatus of claim 1, said transistor having a gate and a gate potential, said lowering comprising lowering said gate potential, said detecting comprising sensing the lowered gate potential and making a determination that the sensed potential is a lowered potential.

20. The apparatus of claim 1, said transistor being an amplifier transistor.

21. A method for handling radiation collection device output signals of one or more radiation collection devices of each of one or more pixel arrangements of an X-ray detector apparatus, said apparatus comprising:
    a pixel readout line common to transistors respectively connected to said devices;
    a switching arrangement for providing a readout signal to said line; and
    a conversion layer subject to an occurrence of a parasitic direct detection event,
    said method comprising:
        responsive to said occurrence, lowering a potential at a transistor from among said transistors;
        detecting the lowered potential; and
        via said switching arrangement and based on a result of the detecting, excluding output from said transistor from contributing to said readout signal.

22. The method according to claim 21, further comprising, responsive to said occurrence, measuring potential respectively for one or more remaining ones of said transistors, and applying a pixel brightness threshold in making a comparison between said lowered potential and said one or more remaining potentials.

23. The method according to claim 22, a potential from among said one or more remaining potentials and said lowered potential pertaining to transistors of a single pixel arrangement from among said arrangements.

24. The method according to claim 22, said making comprising comparing said signals coming from respectively at least two of said devices in one pixel arrangement or a plurality of pixel arrangements.

25. The method according to claim 21, said apparatus comprising a select line operable to cause connection of a plurality of said pixel arrangements to said readout line, said apparatus further comprising a plurality of readout lines, said readout line being from among said plurality, said switching arrangement further comprising switches operable to connect adjacent ones of the readout lines that are connected to an output element.

26. The method according to claim 21, further comprising providing, to an output element, a signal derived from said signals of at least two of said devices.

27. The method according to claim 21, further comprising providing, to an output element, signals of at least four of said devices.

28. The method according to claim 21, further comprising connecting, in a horizontal direction of the array under control of a control circuit, to said sampling capacitors, lines and, when connected through, additional switches.

29. The method according to claim 21, further comprising using additional switches, when connected through, and column lines to connect sampling capacitors in a vertical direction of the array under control of a control circuit.

30. The method according to claim 21, further comprising connecting, when binning switches are activated, sampling capacitors of at least two adjacent ones of said pixel arrangements.

31. The method according to claim 21, wherein a pixel arrangement from among said arrangements comprises a plurality of said devices, said method further comprising connecting said plurality of said devices via one switch, or a plurality of switches, to one readout switch for said plurality of said devices.

32. The method according to claim 21, further comprising connecting a plurality of said devices of a pixel arrangement from among said arrangement via one switch, or a plurality of switches, to a common sample capacitor.

* * * * *